United States Patent
Yonekura et al.

(10) Patent No.: US 7,296,621 B2
(45) Date of Patent: Nov. 20, 2007

(54) AIR CONDITIONER FOR VEHICLES AND METHOD OF CONTROLLING SAME

(75) Inventors: Mitsuru Yonekura, Shioya-gun (JP); Shigenobu Itoh, Tsuchiura (JP)

(73) Assignee: Keihin Corporation, Tokyo (JP)

( * ) Notice: Subject to any disclaimer, the term of this patent is extended or adjusted under 35 U.S.C. 154(b) by 568 days.

(21) Appl. No.: 10/886,791

(22) Filed: Jul. 7, 2004

(65) Prior Publication Data
US 2005/0006084 A1    Jan. 13, 2005

(30) Foreign Application Priority Data
Jul. 7, 2003    (JP)    ............................. 2003-271310
Dec. 3, 2003    (JP)    ............................. 2003-404117

(51) Int. Cl.
*B60H 1/00*    (2006.01)
(52) U.S. Cl. ...................... 165/202; 165/203; 165/222; 165/230; 700/299; 700/300
(58) Field of Classification Search ................ 165/202, 165/203, 204, 222, 230, 287, 288; 700/299, 700/300
See application file for complete search history.

(56) References Cited

U.S. PATENT DOCUMENTS

| | | | |
|---|---|---|---|
| 4,519,443 A | * | 5/1985 | Sutoh et al. ................. 165/204 |
| 4,920,755 A | | 5/1990 | Tadahiro |
| 6,112,807 A | * | 9/2000 | Dage ........................... 165/202 |
| 6,202,934 B1 | * | 3/2001 | Kamiya et al. ............. 165/204 |
| 6,675,597 B2 | * | 1/2004 | Ieda et al. ................... 165/204 |
| 6,702,008 B1 | * | 3/2004 | Hibino et al. ............... 165/204 |
| 6,854,513 B2 | * | 2/2005 | Shirota et al. .............. 165/203 |

FOREIGN PATENT DOCUMENTS

| | | |
|---|---|---|
| DE | 10122532 A1 | 12/2001 |
| EP | 1 000 784 A3 | 5/2000 |
| EP | 1 293 367 A3 | 3/2003 |
| JP | 05-345515 | 12/1993 |
| JP | 2000-62439 | 2/2000 |

OTHER PUBLICATIONS

German Office Action for Application No. 9589848, dated Jul. 20, 2006.
German Office Action for Application No. 10 2004 032 897.8, dated Jul. 20, 2006.

* cited by examiner

*Primary Examiner*—Ljiljana Ciric
(74) *Attorney, Agent, or Firm*—Lahive & Cockfield, LLP; Anthony A. Laurentano, Esq.

(57) ABSTRACT

A window glass dew-point compartment interior absolute humidity Xrmax is acquired, and a temporary compartment interior set absolute humidity Xset (temporary Xset) is determined from a compartment interior set temperature Tset. A smaller one of Xrmax and (temporary Xset) is used as a compartment interior set absolute humidity Xset. An outlet air required absolute humidity Xao required to obtain Xset is calculated taking into account the humidity of exterior air introduced into the passenger compartment. Using Xao and an outlet air required temperature Tao required to obtain Tset, a control temperature Tea for controlling a compressor is determined.

9 Claims, 5 Drawing Sheets

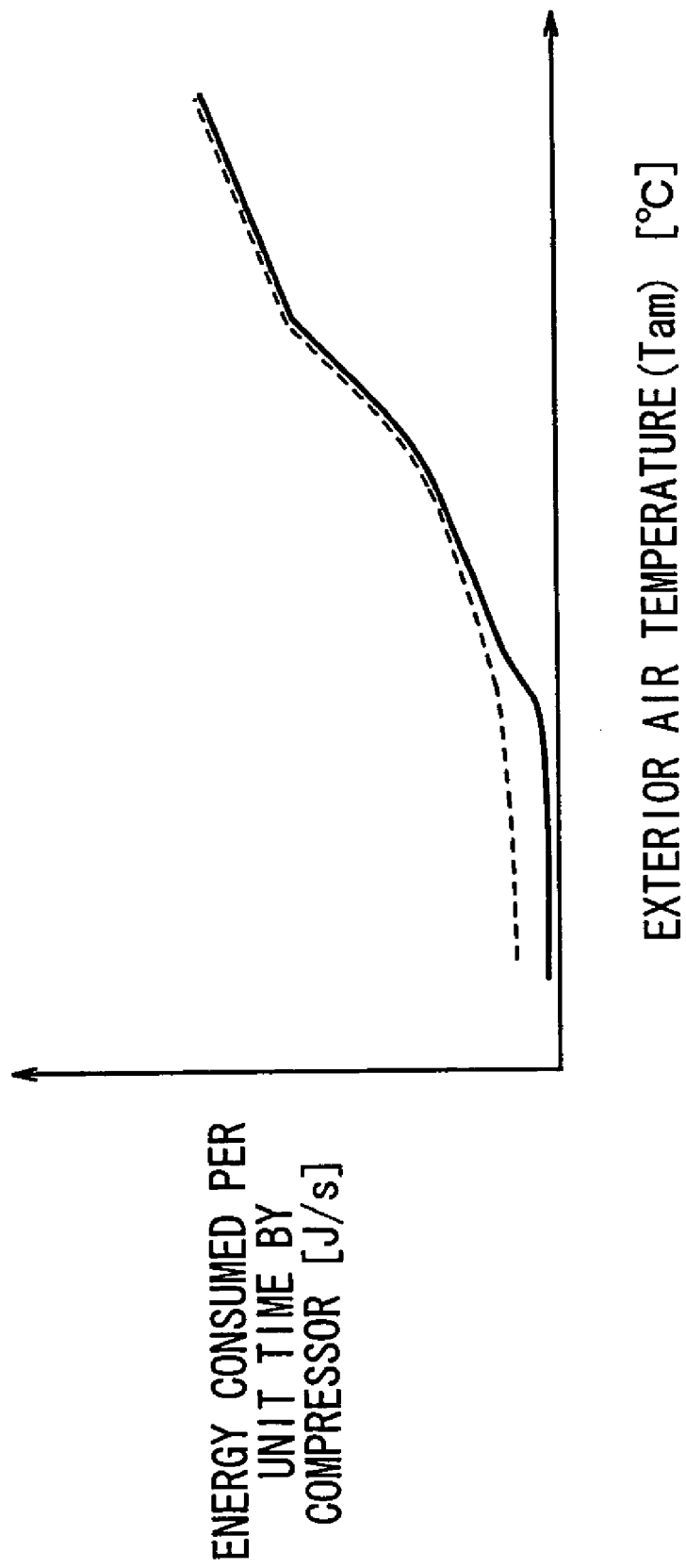

AIR CONDITIONER FOR VEHICLES AND METHOD OF CONTROLLING SAME

BACKGROUND OF THE INVENTION

1. Field of the Invention

The present invention relates to a vehicular air conditioner for controlling a cooling means and a heating means to adjust the temperature and humidity in a passenger compartment without fogging the window glass.

2. Description of the Related Art

Vehicular air conditioners have in combination an evaporator for cooling and dehumidifying air by utilizing the heat of vaporization of a refrigerant and a heater for heating air with the heat of an engine coolant to adjust the temperature and humidity in the passenger compartment of a vehicle.

If the vehicular air conditioner is controlled to lower the cooling ability of the evaporator at a low atmospheric temperature, then since the dehumidifying ability of the evaporator is also lowered, the water vapor in the passenger compartment is possibly condensed on the window glass, etc. when the atmospheric temperature is low and the atmospheric humidity is high.

To eliminate the above drawback, a conventional vehicular air conditioner for keeping a sufficient dehumidifying capability to prevent the window glass from fogging due to condensation, and also for preventing unnecessary cooling thereby to save energy has been developed (see, for example, Japanese Patent No. 3298151 for details).

The conventional vehicular air conditioner estimates the temperature of the surface of a window glass and calculates a necessary humidity of ejected air which represents the humidity in the passenger compartment that will not cause window condensation at the estimated temperature. Further, the conventional vehicular air conditioner determines a dew point of air which represents the calculated necessary humidity of ejected air, and sets a lower temperature of a necessary temperature of ejected air and the dew point as a control temperature of the evaporator for controlling the temperature in the passenger compartment at a preset temperature. The conventional vehicular air conditioner uses a preset humidity in the passenger compartment and humidity in the passenger compartment which is detected by a humidity sensor installed in the passenger compartment for the calculation of the necessary humidity of ejected air.

If the temperature of ejected air that is necessary for controlling the temperature in the passenger compartment at the preset temperature is lower than the temperature of ejected air that produces the humidity in the passenger compartment that will not cause window condensation, then since the humidity in the passenger compartment is high even if the temperature in the passenger compartment is close to the preset temperature, the passengers in the passenger compartment may feel uncomfortable.

If the humidity in the passenger compartment is lower than the humidity which causes window condensation, and the temperature is lower than the present temperature entered by the passengers, and the humidity is lower than the humidity which makes the passengers feel uncomfortable, then since the passenger compartment does not need to be further cooled or dehumidified, there the cooling ability of the evaporator may further be controlled in order to save energy.

If the humidity of exterior air that enters the passenger compartment is not taken into account in the process of determining the temperature of ejected air that produces the humidity in the passenger compartment that will not cause window condensation, because the necessary humidity of ejected air cannot be calculated highly accurately on account of a humidity change caused by the humidity of introduced exterior air, the cooling ability of the evaporator may possibly be excessively controlled or the necessary amount of dehumidification cannot be obtained.

SUMMARY OF THE INVENTION

It is a general object of the present invention to provide a vehicular air conditioner which is capable of controlling the interior of a passenger compartment at an appropriate temperature and humidity, avoiding condensation on the window glass, and limiting energy consumption to a required minimum, and a method of controlling such a vehicular air conditioner.

A major object of the present invention is to provide a vehicular air conditioner which is capable of controlling the temperature and humidity in a passenger compartment without fogging the windows, using the cooling capacity of a compressor as a required minimum, and a method of controlling such a vehicular air conditioner.

Another object of the present invention is to provide a vehicular air conditioner which is capable of controlling the temperature and humidity in a passenger compartment taking into account the humidity of exterior air introduced into the passenger compartment, and a method of controlling such a vehicular air conditioner.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a diagram showing the energy consumed per unit time by a compressor with respect to exterior air temperature according to the present invention, in comparison with the energy consumed by a conventional air conditioner.

DESCRIPTION OF THE PREFERRED EMBODIMENT

Figure 1:
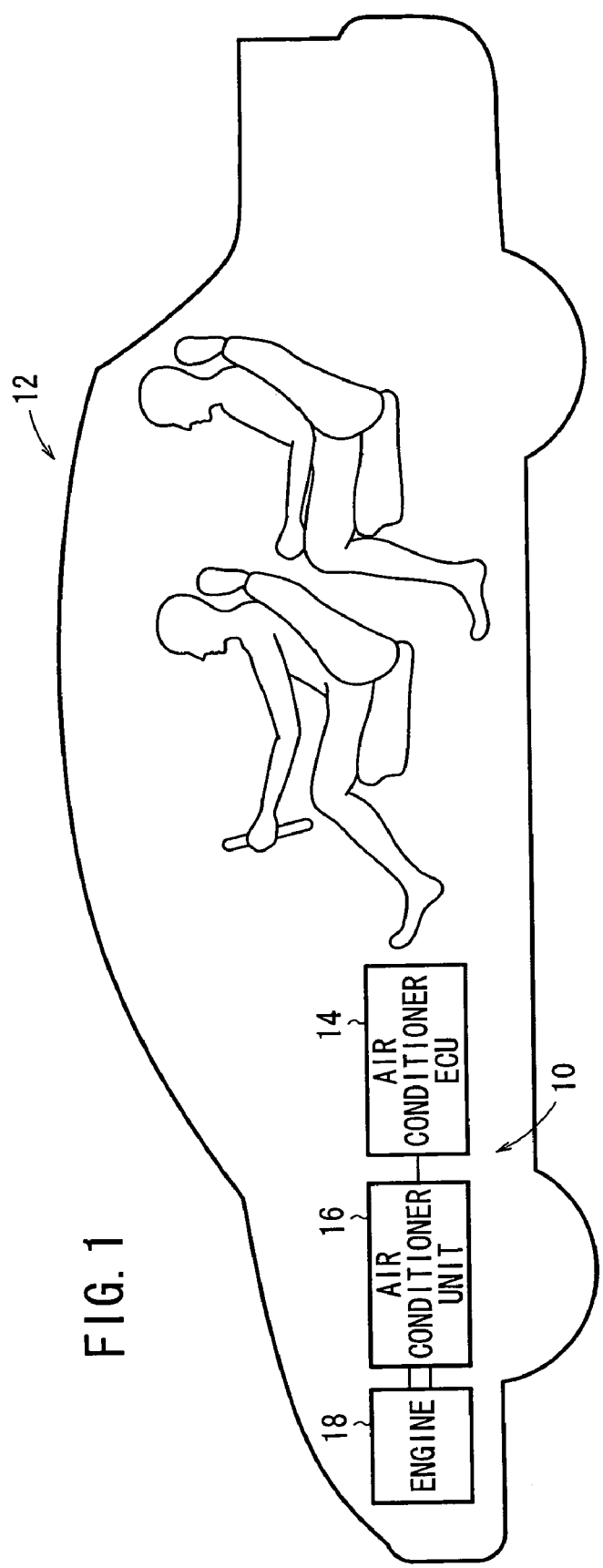
FIG. 1 is a schematic view, partly in block form, of a vehicle incorporating a vehicular air conditioner according to the present invention.
Figure 2:
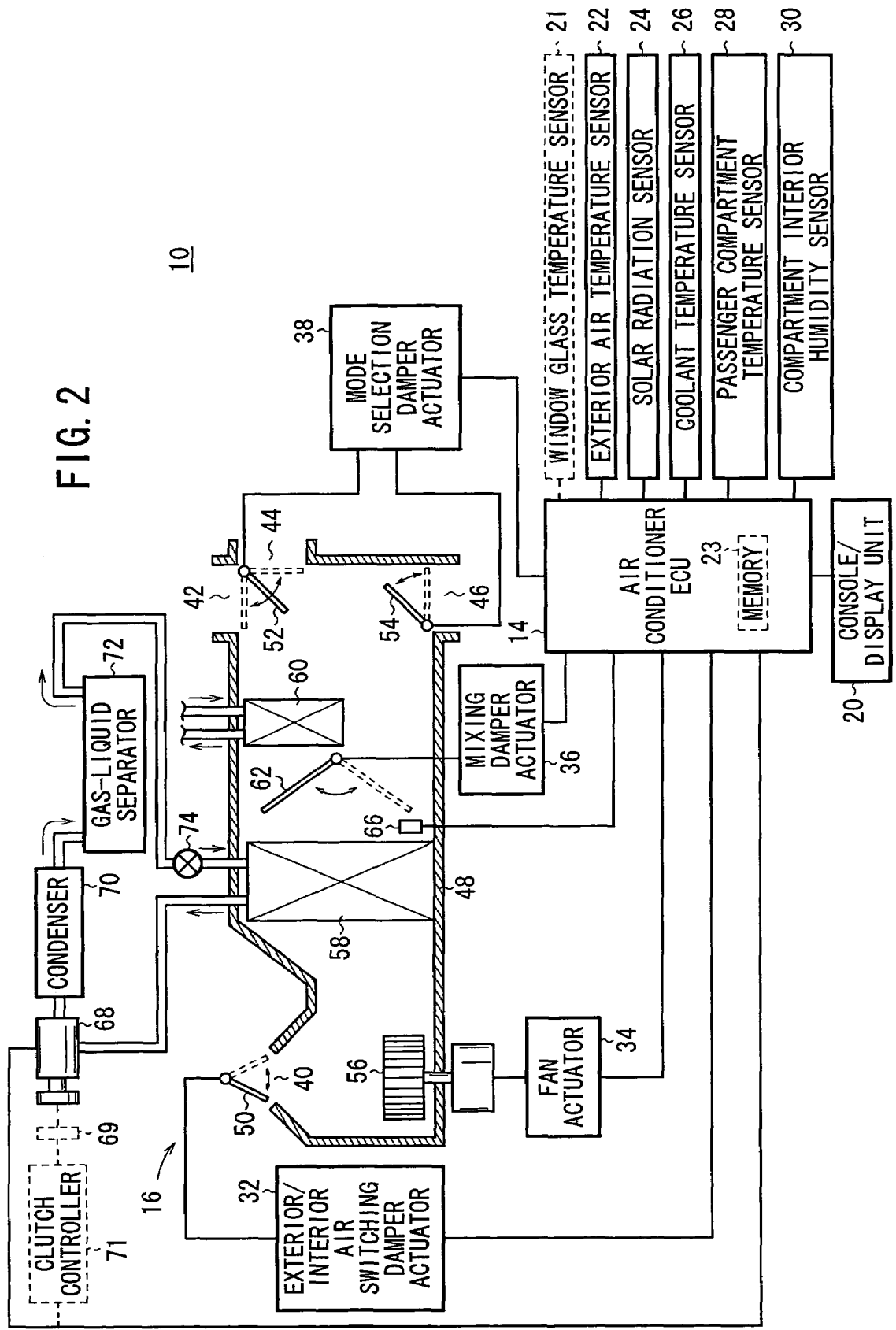
FIG. 2 is a schematic view, partly in block form, of the vehicular air conditioner according to the present invention.

FIG. 1 schematically shows a vehicle 12 incorporating a vehicular air conditioner 10 according to the present invention, and FIG. 2 shows the vehicular air conditioner 10 in detail. As shown in FIG. 1, the vehicular air conditioner 10 comprises an air conditioner ECU (Electronic Control Unit) 14, and an air conditioner unit 16 controlled by the air conditioner ECU 14 for adjusting the temperature and humidity of air and the quantity of supplied air. The air conditioner unit 16 is supplied with a coolant from an engine 18 which propels the vehicle 12.

As shown in FIG. 2, to the air conditioner ECU 14, there is connected a console/display unit 20 which receives control inputs representative of a temperature setting, an amount-of-supplied-air setting, a mode selection, etc.

entered by a passenger on the vehicle 12 and displaying a set temperature, a set amount of supplied air, and a selected mode.

To the air conditioner ECU 14, there are also connected an exterior air temperature sensor 22 for detecting the temperature of exterior air around the vehicle 12, a solar radiation sensor 24 for detecting the amount of solar radiation applied to the vehicle 12, a coolant temperature sensor 26 for detecting the temperature of the coolant supplied from the engine 18, a passenger compartment temperature sensor 28 for detecting the temperature in the passenger compartment of the vehicle 12, and a compartment interior humidity sensor 30 for detecting the humidity in the passenger compartment of the vehicle 12. If necessary, a window glass temperature sensor 21 for directly detecting the temperature of the surface of a window glass which faces the interior of the passenger compartment may be connected to the air conditioner ECU 14.

The air conditioner unit 16 has an exterior/interior air switching damper actuator 32, a fan actuator 34, an air mixing damper actuator 36, and a mode selection damper actuator 38, which are all connected to the air conditioner ECU 14. The air conditioner unit 16 also has a duct 48 which has an exterior/interior air inlet 40 for introducing exterior air or interior air, and defroster, face, and foot outlets 42, 44, 46 for supplying air, whose temperature, humidity, and supplied quantity have been adjusted, into predetermined regions, i.e., defroster, face, and foot regions, in the passenger compartment. The exterior/interior air inlet 40 is combined with an exterior/interior air switching damper 50 which is actuated by the exterior/interior air switching damper actuator 32 to switch between exterior air and interior air. The defroster, face, and foot outlets 42, 44, 46 are combined with mode selection dampers 52, 54 which are actuated by the mode selection damper actuator 38 to switch between the defroster, face, and foot outlets 42, 44, 46.

The duct 48 houses therein a fan 56 disposed closely to the exterior/interior air inlet 40 and actuatable by the fan actuator 34. The duct 48 also houses therein an evaporator 58 disposed downstream of the fan 56 with respect to the direction of air delivered by the fan 56 in an intermediate region of the duct 48. The evaporator 58 serves to cool and dehumidify air that is delivered by the fan 56. Between the evaporator 58 and the outlets 42, 44, 46, there is disposed a heater 60 for heating air that has passed through the evaporator 58 with the coolant supplied from the engine 18. An air mixing damper 62 is disposed between the evaporator 58 and the heater 60 and is actuated by the air mixing damper actuator 36 to adjust the amount of air that has passed through the evaporator 58 and is supplied to the heater 60.

An evaporator outlet temperature sensor 66 for detecting the temperature of air discharged from an air outlet of the evaporator 58 is disposed near the air outlet of the evaporator 58. The evaporator outlet temperature sensor 66 is connected to the air conditioner ECU 14.

The air conditioner unit 16 further has a compressor 68 actuated by the rotational power from the engine 18 for compressing a refrigerant, a condenser 70 for condensing the refrigerant which is compressed by the compressor 68, a gas-liquid separator 72 for separating the refrigerant condensed by the condenser 70 into a liquid component and a gas component, and an expansion valve 74 for expanding the gas component of the refrigerant which has been separated by the gas-liquid separator 72 and supplying the expanded gas component to the evaporator 58. The refrigerant supplied to the evaporator 58 is supplied in circulation to the compressor 68. If the compressor 68 is of a variable-capacity type, then it is connected to the air conditioner ECU 14, which controls the capacity of the compressor 68. If the compressor 68 is of a fixed-capacity type, then a clutch controller 71 for controlling a clutch 69, which selectively connects and disconnects the engine 18 and the compressor 68, is connected to the air conditioner ECU 14, which controls the compressor 68 through the clutch controller 71.

Figure 3:
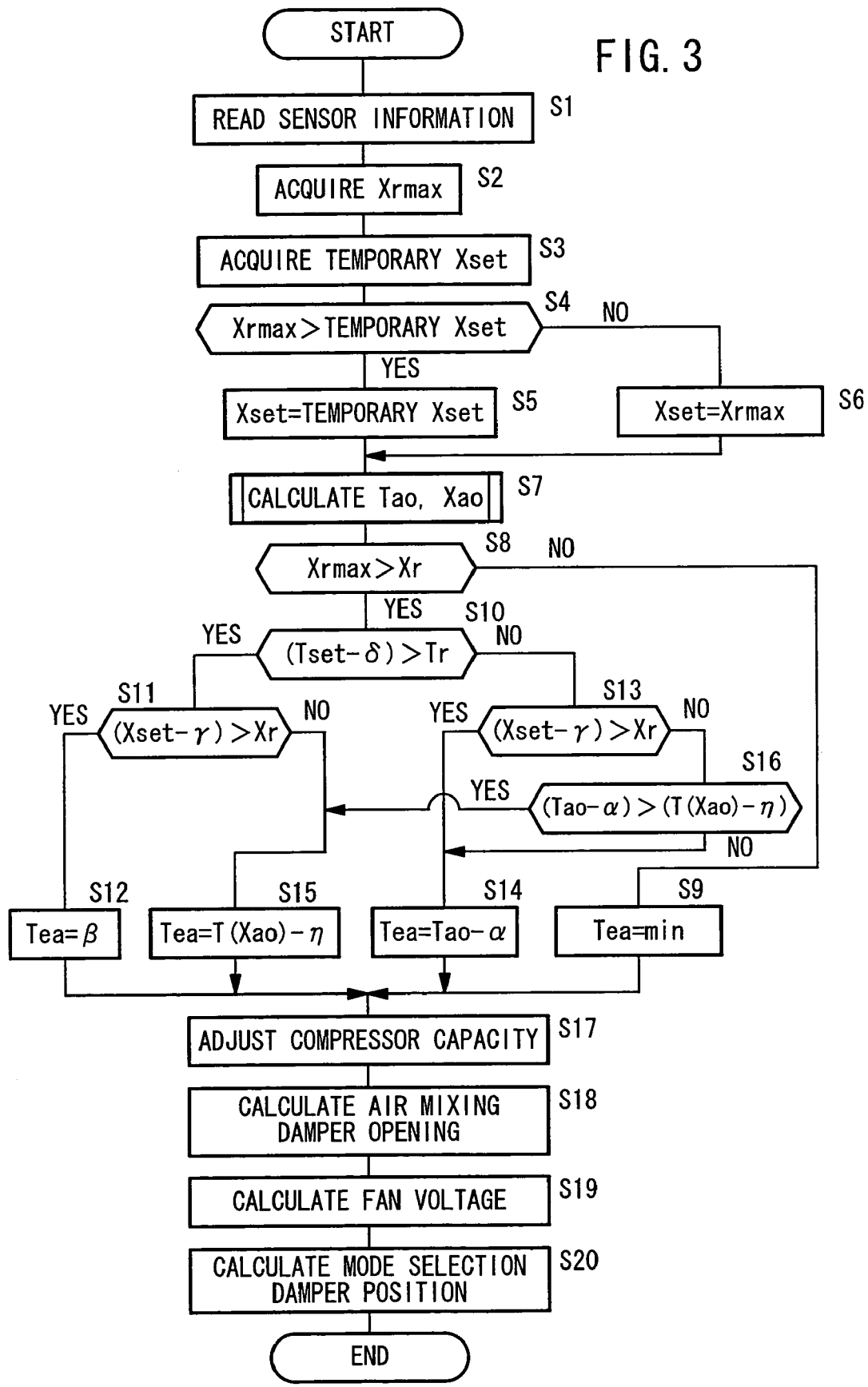
FIG. 3 is a flowchart of a processing sequence of the vehicular air conditioner according to the present invention.

The vehicular air conditioner 10 is basically constructed as described above. Operation of the vehicular air conditioner 10 will be described below with reference to a flowchart shown in FIG. 3.

A passenger on the vehicle 12 operates the console/display unit 20 to turn on the power supply of the vehicular air conditioner 10, and then sets a temperature, an amount of supplied air, and a mode. The air conditioner ECU 14 reads sensor information from the exterior air temperature sensor 22, the solar radiation sensor 24, the coolant temperature sensor 26, the passenger compartment temperature sensor 28, the compartment interior humidity sensor 30, and the evaporator outlet temperature sensor 66 in step S1.

The air conditioner ECU 14 acquires a window glass dew-point compartment interior absolute humidity Xrmax that is a limit compartment interior absolute humidity at which no water vapor is condensed on the surface of a window glass, which faces the interior of the passenger compartment, in step S2.

While the vehicle 12 is running, a window glass compartment interior surface temperature Tg, which is the temperature of the surface of a window glass, which faces the interior of the passenger compartment, is regarded as being substantially equal to an exterior air temperature Tam. Using a psychrometric chart shown in FIG. 4, a window glass dew-point compartment interior absolute humidity Xrmax can be determined from an exterior air temperature Tam (=Tg) that is detected by the exterior air temperature sensor 22. Alternatively, the window glass temperature sensor 21 may be mounted on the surface of a window glass which faces the interior of the passenger compartment, and a window glass dew-point compartment interior absolute humidity Xrmax may be determined using a window glass compartment interior surface temperature Tg that is directly detected by the window glass temperature sensor 21.

Figure 4:
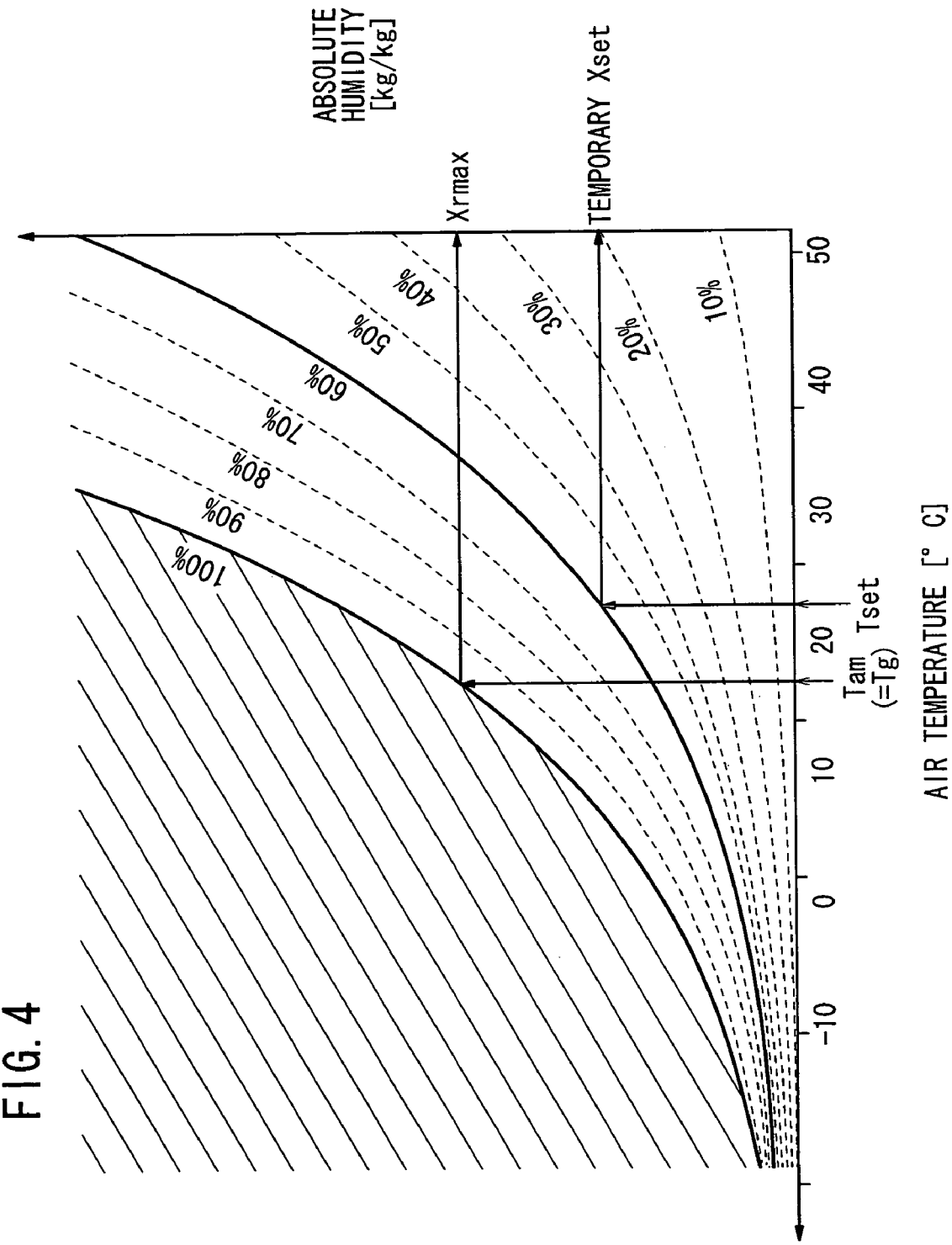
FIG. 4 is a diagram showing a psychrometric chart.

The psychrometric chart shown in FIG. 4 represents the relationship between physical states such as air temperature (° C.), air absolute humidity (kg/kg), air relative humidity (%), and enthalpy. A window glass dew-point compartment interior absolute humidity Xrmax may be determined by expressing the relationship between air temperature and air absolute humidity at a relative humidity of 100% in the form of a polynomial, and calculating the polynomial using an exterior air temperature Tam (=Tg) as a variable. Alternatively, the relationship may be stored as a lookup table in a memory 23 of the air conditioner ECU 14, and a window glass dew-point compartment interior absolute humidity Xrmax may be determined from the lookup table based on an exterior air temperature Tam or a window glass compartment interior surface temperature Tg which is acquired.

Then, the air conditioner ECU 14 determines a compartment interior set absolute humidity Xset within a range in which the window glass is not fogged and the passenger feels comfortable in the passenger compartment in steps S3 through S6.

Specifically, the air conditioner ECU 14 determines a temporary compartment interior set absolute humidity Xset (temporary Xset) from the psychrometric chart shown in FIG. 4 using a compartment interior set temperature Tset, which is set with the console/display unit 20 by the passenger, and a preset compartment interior upper limit relative humidity in step S3. The compartment interior upper limit relative humidity may be set to a relative humidity of about 60% that is an upper limit relative humidity at which human beings normally feel comfortable in the passenger compartment. The compartment interior upper limit relative humidity may be set by the passenger with a setting dial on the console/display unit 20.

The relationship between two variable indicative of the air temperature and the air relative humidity, and the air absolute humidity may be expressed by a polynomial, and a temporary compartment interior set absolute humidity Xset (temporary Xset) may be determined by calculating the polynomial using the compartment interior upper limit relative humidity as a variable. Alternatively, the relationship at each air relative humidity may be stored as a lookup table in the memory 23 of the air conditioner ECU 14, and a temporary compartment interior set absolute humidity Xset (temporary Xset) may be determined from lookup table based on a selected air relative humidity.

Then, the air conditioner ECU 14 compares the window glass dew-point compartment interior absolute humidity Xrmax and the temporary compartment interior set absolute humidity Xset (temporary Xset) with each other in step S4. If Xrmax>temporary Xset, then even when air having the temporary compartment interior set absolute humidity Xset (temporary Xset) is cooled in the vicinity of the window glass, the window glass is not fogged because the air does not exceed the relative humidity of 100%. On the other hand, if Xrmax≦temporary Xset, then when air having the temporary compartment interior set absolute humidity Xset (temporary Xset) is cooled in the vicinity of the window glass, because the air exceeds the relative humidity of 100%, the window glass is fogged.

Therefore, if Xrmax>temporary Xset, then the air conditioner ECU 14 sets the compartment interior set absolute humidity Xset to the temporary compartment interior set absolute humidity Xset (temporary Xset) (Xset=temporary Xset) in step S5. If Xrmax≦temporary Xset, then the air conditioner ECU 14 sets the compartment interior set absolute humidity Xset to the window glass dew-point compartment interior absolute humidity Xrmax (Xset=Xrmax) in step S6. By thus setting the compartment interior set absolute humidity Xset, with the cooling capacity of the compressor being used as a required minimum, the window glass is not fogged, and a comfortable humidity is achieved in the passenger compartment.

Then, the air conditioner ECU 14 calculates an outlet air required temperature Tao and an outlet air required absolute humidity Xao at the outlet 42, 44, or 46 which are required to achieve the compartment interior set temperature Tset and the compartment interior set absolute humidity Xset in step S7.

An outlet air required temperature Tao is calculated from the compartment interior set temperature Tset which is set by the passenger, the compartment interior temperature Tr detected by the passenger compartment temperature sensor 28, the exterior air temperature Tam detected by the exterior air temperature sensor 22, and the amount Ts of solar radiation detected by the solar radiation sensor 24, according to the following equation (1):

$$Tao = Ktset \cdot Tset - Ktr \cdot Tr - Ktam \cdot Tam - Kts \cdot Ts - Ct \qquad (1)$$

where

Ktset is a compartment interior set temperature coefficient;

Ktr is a compartment interior temperature sensor coefficient;

Ktam is an exterior air temperature sensor coefficient;

Kts is a solar radiation sensor coefficient; and

Ct is a temperature calculating coefficient.

The exterior air temperature Tam is regarded as being approximately proportional to the exterior air humidity, and an outlet air required absolute humidity Xao is calculated from the compartment interior set absolute humidity Xset determined in step S5 or S6, a compartment interior absolute humidity Xr detected by the compartment interior humidity sensor 30, and the exterior air temperature Tam detected by the exterior air temperature sensor 22, according to the following equation (2):

$$Xao = Kxset \cdot Xset - Kxr \cdot Xr - Kxam \cdot Tam - Cx1 \qquad (2)$$

where

Kxset is a compartment interior set absolute humidity coefficient;

Kxr is a compartment interior absolute humidity coefficient;

Kxam is an exterior air absolute humidity coefficient; and

Cx1 is a humidity calculating coefficient.

If the compartment interior humidity sensor 30 is a sensor for detecting relative humidities, then a compartment interior absolute humidity Xr may be determined from the psychrometric chart shown in FIG. 4 using the compartment interior temperature Tr detected by the passenger compartment temperature sensor 28 and the relative humidity detected by the compartment interior humidity sensor 30.

Using the outlet air required temperature Tao and the outlet air required absolute humidity Xao thus calculated, the air conditioner ECU 14 calculates a control temperature Tea for minimizing the ratio of operation of the compressor 68.

If the compressor 68 is of a fixed capacity and is connected between the engine 18 and the clutch 69, the air conditioner ECU 14 controls the detected value of the evaporator outlet temperature sensor 66 at the control temperature Tea when the compressor 68 is disconnected from the engine 18 and also controls the detected value of the evaporator outlet temperature sensor 66 at the control temperature Tea+ε (ε: a constant) when the compressor 68 is connected to the engine 18.

The air conditioner ECU 14 compares the window glass dew-point compartment interior absolute humidity Xrmax acquired in step S2 with the compartment interior absolute humidity Xr detected by the compartment interior absolute humidity Xr detected by the compartment interior humidity sensor 30 in step S8. If Xrmax≦Xr, then when the air in the passenger compartment is cooled in the vicinity of the window glass, the window glass may be fogged. Therefore, in order to maximize the dehumidifying ability of the evaporator 58, the air conditioner ECU 14 sets the control temperature Tea to a lower limit humidity min at which the evaporator 58 is not frosted in step S9.

If Xrmax>Xr in step S8, then even when the air in the passenger compartment is cooled in the vicinity of the window glass, because the air does not exceed the relative humidity of 100%, the window glass is not fogged. If a margin for the temperature is represented by δ and a margin for the humidity by γ, and if (Tset−δ)>Tr in step S10 and (Xset−γ)>Xr in step S11, then since the passenger compartment does not need to be further dehumidified and cooled at present, the air conditioner ECU 14 sets Tea=β (e.g., about 20° C.) in order to minimize the operation of the compressor 68 in step S12.

If Xrmax>Xr in step S8, (Tset−δ)≦Tr in step S10, and (Xset−γ)>Xr in step S13, then the air conditioner ECU 14 judges that the passenger compartment needs to be cooled. If a margin for the outlet air required temperature Tao is represented by α, and the air conditioner ECU 14 sets Tea=Tao−α in step S14.

If Xrmax>Xr in step S8, (Tset−δ)>Tr in step S10, and (Xset−γ)≦Xr in step S11, then the air conditioner ECU 14 judges that the passenger compartment needs to be dehumidified. If the temperature at which the outlet air required absolute humidity Xao is achieved with the relative humidity of 100% is represented by T(Xao) and a calculating coefficient for the temperature T(Xao) by η, and the air conditioner ECU 14 sets Tea=T(Xao)−η in step S15.

If Xrmax>Xr in step S8, (Tset−δ)≦Tr in step S10, and (Xset−γ)≦Xr in step S13, then the air conditioner ECU 14 judges that the passenger compartment needs to be cooled and dehumidified. The air conditioner ECU 14 compares Tao−α and T(Xao)−η with each other in step S16, and sets the smaller value as the control temperature Tea in step S14 or S15.

After the control temperature Tea is thus set, if the compressor 68 is of a variable capacity, then the air conditioner ECU 14 adjusts the capacity of the compressor 68 in step S17. Then, the air conditioner ECU 14 calculates the opening of the air mixing damper 62 in step S18, and operates the air mixing damper actuator 36 to adjust the opening of the air mixing damper 62. The air conditioner ECU 14 calculates a voltage to be applied to the fan actuator 34 in order to cause the fan 56 to supply a required amount of air in step S19, and operates the fan actuator 34 at the calculated voltage. The air conditioner ECU 14 thus calculates the position of the mode selection damper 52 or 54 according to the mode set by the console/display unit 20 in step S20, and operates the mode selection damper actuator 38 to switch the mode selection damper 52 or 54.

Then, the air conditioner unit 16 is operated to air-condition the passenger compartment to equalize the temperature in the passenger compartment and the compartment interior set temperature Tset, and also to equalize the humidity in the passenger compartment and the compartment interior set absolute humidity Xset. The passenger compartment is thus adjusted to an air-conditioned state, in which the window glass is prevented from being fogged, and the humidity in the passenger compartment is prevented from exceeding an upper limit for comfortable humidity. Since the compressor 68 is controlled with a required minimum drive power to keep the passenger compartment in the above air-conditioned state, the energy consumed by the compressor 68 is saved. FIG. 5 shows a comparison of energies consumed per unit time by the compressor 68 with respect to the exterior air temperature Tam when the control temperature Tea was calculated according to the equation (2) with the term Kxma·Tam ignored and the air conditioner unit 16 was controlled (as indicated by the dotted-line curve) and when the control temperature Tea was calculated according to the equation (2) and the air conditioner unit 16 was controlled (as indicated by the solid-line curve), under such conditions that the exterior humidity was normal (e.g., 50%), the compartment interior set temperature Tset was 25° C., and the compartment interior upper limit relative humidity was 60%. As shown in FIG. 5, the power consumed by the compressor 68 according to the present embodiment is smaller than that of the conventional system.

Although a certain preferred embodiment of the present invention has been shown and described in detail, it should be understood that various changes and modifications may be made therein without departing from the scope of the appended claims.

What is claimed is:

1. A vehicular air conditioner comprising:

heating means for heating air;

cooling means for cooling air;

window glass compartment interior surface temperature acquiring means for acquiring a window glass compartment interior surface temperature Tg;

window glass dew-point compartment interior absolute humidity acquiring means for acquiring a window glass dew-point compartment interior absolute humidity Xrmax with said window glass compartment interior surface temperature Tg serving as a dew point;

temporary compartment interior set absolute humidity acquiring means for acquiring a temporary compartment interior set absolute humidity (temporary Xset) with respect to a temporary compartment interior allowable upper limit relative humidity at a compartment interior set temperature Tset;

compartment interior set absolute humidity setting means for setting a compartment interior set absolute humidity Xset such that if Xrmax>temporary Xset, Xset=temporary Xset, and if Xrmax≦temporary Xset, Xset=Xrmax;

compartment interior absolute humidity acquiring means for acquiring a compartment interior absolute humidity Xr;

outlet air required temperature calculating means for calculating an outlet air required temperature Tao required required to obtain said compartment interior set temperature Tset according to:

$$Tao = Ktset \cdot Tset - Ktr \cdot Tr - Ktam \cdot Tam - Kts \cdot Ts - Ct$$

where

Ktset is a compartment interior set temperature coefficient;

Ktr is a compartment interior temperature sensor coefficient;

Ktam is an exterior air temperature sensor coefficient;

Kts is a solar radiation sensor coefficient;

Ct is a temperature calculating coefficient;

Tr is a compartment interior temperature;

Tam is an exterior air temperature; and

Ts is an amount of solar radiation;

outlet air required absolute humidity calculating means for calculating an outlet air required absolute humidity Xao required to obtain said compartment interior set absolute humidity Xset according to:

$$Xao = Kxset \cdot Xset - Kxr \cdot Xr - Kxam \cdot Tam - Cx1$$

where

Kxset is a compartment interior set absolute humidity coefficient;

Kxr is a compartment interior absolute humidity coefficient;

Kxam is an exterior air absolute humidity coefficient; and

Cx1 is a humidity calculating coefficient;

control temperature calculating means for calculating a control temperature Tea for the air to be cooled by said cooling means, based on said outlet air required temperature Tao and said outlet air required absolute humidity Xao;

cooling control means for controlling a cooling ability of said cooling means based on said control temperature Tea; and heating control means for controlling a heating ability of said heating means based on said control temperature Tea.

2. A vehicular air conditioner according to claim 1, wherein said control temperature calculating means calculates said control temperature Tea such that if Xrmax≦Xr, then Tea=min where min is a lower limit temperature at which said cooling means is not frosted;

if Xrmax>Xr, (Tset−δ)≦Tr, and (Xset−γ)>Xr, then Tea=Tao−α where δ is a predetermined margin;

γ is a predetermined margin;

α is a constant;

if Xrmax>Xr, (Tset−δ)>Tr, and (Xset−γ)≦Xr, then Tea=T(Xao)−η where η is a calculating coefficient;

T(Xao) is a temperature at which said outlet air required absolute humidity Xao is achieved with the relative humidity of 100%;

if Xrmax>Xr, (Tset−δ)≦Tr, and (Xset−γ)≦Xr, then Tea=a smaller one of Tao−α and T(Xao)−η; and if Xrmax>Xr, (Tset−δ)>Tr, and (Xset−γ)>Xr, then Tea=β where β is a constant.

3. A vehicular air conditioner according to claim 1, wherein said window glass compartment interior surface temperature acquiring means comprises an exterior air temperature sensor for detecting the exterior air temperature as said window glass compartment interior surface temperature Tg.

4. A vehicular air conditioner according to claim 1, wherein said window glass compartment interior surface temperature acquiring means comprises a window glass temperature sensor for detecting said window glass compartment interior surface temperature Tg.

5. A vehicular air conditioner according to claim 1, wherein said compartment interior absolute humidity acquiring means comprises a compartment interior humidity sensor for detecting said compartment interior absolute humidity Xr.

6. A vehicular air conditioner according to claim 1, further comprising:

memory means for storing a psychrometric chart representing the relationship between air temperatures and absolute humidity for causing condensation at respective said air temperatures;

wherein said window glass dew-point compartment interior absolute humidity acquiring means acquires an absolute humidity with said window glass compartment interior surface temperature Tg as a dew point as said window glass dew-point compartment interior absolute humidity Xrmax, from said memory means.

7. A vehicular air conditioner according to claim 1, further comprising:

memory means for storing a psychrometric chart representing the relationship between air temperatures and absolute humidities with respect to allowable upper limit relative humidities at respective said air temperatures;

wherein said temporary compartment interior set absolute humidity acquiring means acquires an absolute humidity with respect to an allowable upper limit relative humidity at said compartment interior set temperature Tset as said temporary compartment interior set absolute humidity (temporary Xset), from said memory means.

8. A method of controlling a vehicular air conditioner, comprising the steps of:

acquiring a window glass compartment interior surface temperature Tg;

acquiring a window glass dew-point compartment interior absolute humidity Xrmax with said window glass compartment interior surface temperature Tg as a dew point;

acquiring a temporary compartment interior set absolute humidity (temporary Xset) with respect to a temporary compartment interior allowable upper limit relative humidity at a compartment interior set temperature Tset;

setting a compartment interior set absolute humidity Xset such that if Xrmax>temporary Xset, then Xset=temporary Xset, and if Xrmax≦temporary Xset, then Xset=Xrmax;

acquiring a compartment interior absolute humidity Xr;

calculating an outlet air required temperature Tao required to obtain said compartment interior set temperature Tset according to the equation:

$$Tao = Ktset \cdot Tset - Ktr \cdot Tr - Ktam \cdot Tam - Kts \cdot Ts - Ct$$

where

Ktset is a compartment interior set temperature coefficient;

Ktr is a compartment interior temperature sensor coefficient;

Ktam is an exterior air temperature sensor coefficient;

Kts is a solar radiation sensor coefficient;

Ct is a temperature calculating coefficient;

Tr is a compartment interior temperature;

Tam is an exterior air temperature; and

Ts is an amount of solar radiation;

calculating an outlet air required absolute humidity Xao required to obtain said compartment interior set absolute humidity Xset according to the equation:

$$Xao = Kxset \cdot Xset - Kxr \cdot Xr - Kxam \cdot Tam - Cx1$$

where

Kxset is a compartment interior set absolute humidity coefficient;

Kxr is a compartment interior absolute humidity coefficient;

Kxam is an exterior air absolute humidity coefficient; and

Cx1 is a humidity calculating coefficient;

calculating a control temperature Tea for the air to be cooled by said cooling means, based on said outlet air required temperature Tao and said outlet air required absolute humidity Xao;

controlling a cooling ability based on said control temperature Tea; and controlling a heating ability based on said control temperature Tea.

9. A method according to claim 8, wherein said control temperature Tea is calculated such that if Xrmax≦Xr, then Tea=min where min is a lower limit temperature at which said cooling means is not frosted;

if Xrmax>Xr, (Tset−δ)≦Tr, and (Xset−γ)>Xr, then Tea=Tao−α where δ is a predetermined margin;

γ is a predetermined margin;

α is a constant;

if Xrmax>Xr, (Tset−δ)>Tr, and (Xset−γ)≦Xr, then Tea=T(Xao)−η where η is a calculating coefficient;

T(Xao) is a temperature at which said outlet air required absolute humidity Xao is achieved with the relative humidity of 100%;

if Xrmax>Xr, (Tset−δ)≦Tr, and (Xset−γ)≦Xr, then Tea=a smaller one of Tao−α and T(Xao)−η; and if Xrmax>Xr, (Tset−δ)>Tr, and (Xset−γ)>Xr, then Tea=β where β is a constant.

* * * * *